United States Patent
Yoshida et al.

(10) Patent No.: US 7,311,012 B2
(45) Date of Patent: Dec. 25, 2007

(54) ELONGATION MEASURING DEVICE

(75) Inventors: Tetsuya Yoshida, Kakogawa (JP); Masaya Yoshida, Himeji (JP)

(73) Assignee: Kawaski Jukogyo Kabushiki Kaisha, Kobe (JP)

( * ) Notice: Subject to any disclaimer, the term of this patent is extended or adjusted under 35 U.S.C. 154(b) by 318 days.

(21) Appl. No.: 11/057,186

(22) Filed: Feb. 15, 2005

(65) Prior Publication Data

US 2005/0206339 A1     Sep. 22, 2005

(30) Foreign Application Priority Data

Feb. 23, 2004  (JP) ............................ 2004-046461

(51) Int. Cl.
 G01M 19/00   (2006.01)
 G05D 3/12    (2006.01)
 G01B 21/06   (2006.01)
 B65G 43/00   (2006.01)

(52) U.S. Cl. ................. 73/865.8; 73/865.9; 198/502.1; 700/230

(58) Field of Classification Search .... 73/865.8–865.9; 198/340, 341.01, 341.08, 502.1; 702/113, 702/158; 700/230, 302–303
See application file for complete search history.

(56) References Cited

U.S. PATENT DOCUMENTS

| | | | | |
|---|---|---|---|---|
| 4,685,630 A | * | 8/1987 | Buhren et al. | 242/474 |
| 4,741,556 A | * | 5/1988 | Nagashima | 280/807 |
| 4,852,249 A | * | 8/1989 | Muskulus et al. | 29/825 |
| 5,913,710 A | * | 6/1999 | Tessmann et al. | 451/10 |
| 5,990,422 A | * | 11/1999 | Komori et al. | 177/25.11 |
| 6,068,413 A | * | 5/2000 | Karaki et al. | 396/612 |
| 6,761,178 B2 | * | 7/2004 | Kuroda et al. | 134/56 R |

FOREIGN PATENT DOCUMENTS

| | | | | |
|---|---|---|---|---|
| DE | 2923014 A | * | 2/1981 | |
| DE | 4217607 A | * | 2/1994 | |
| EP | 69273 A2 | * | 1/1983 | |
| JP | 60143746 A | * | 7/1985 | |
| JP | 01032145 A | * | 2/1989 | |
| JP | A 2000-141274 | | 5/2000 | |
| JP | 2002013904 A | * | 1/2002 | |
| JP | 2002-164409 | | 6/2002 | |
| JP | 2002-255311 | | 9/2002 | |
| JP | 2002-309994 | | 10/2002 | |
| JP | 2003240534 A | * | 8/2003 | |

* cited by examiner

*Primary Examiner*—Thomas P. Nolad
(74) *Attorney, Agent, or Firm*—Oliff & Berridge, PLC

(57) ABSTRACT

An elongation measuring device 10 measures an elongation in a timing belt 4 included in a driving device 1 provided with a drive roller 2. The elongation measuring device 10 is provided with an encoder 11 and a microphotosensor 12. A present angular position of the drive roller 2 measured at a present-stage measuring cycle and a past angular position of the same measured at a past-stage measuring cycle. The difference between the present and the past angular position is due to the elongation of the timing belt 4. An elongation in the timing belt 4 is estimated on the basis of the difference between the present and the past angular position. Time when the timing belt 4 may possibly break is forecast on the basis of the elongation in the timing belt. The worn out timing belt 4 is replaced with a new one before the same breaks.

7 Claims, 9 Drawing Sheets

ELONGATION MEASURING DEVICE

BACKGROUND OF THE INVENTION

1. Field of the Invention

The present invention relates to an elongation measuring device for measuring an elongation in a belt-like member included in a driving mechanism, wound round a rotative driving member and carrying a driven movable object.

2. Description of the Related Art

Some driving device for driving a driven movable object for displacement is provided with a belt-drive mechanism. A belt-drive mechanism employing a timing belt is capable of displacing a movable object at a low cost, in a narrow space without excessively vibrating the driven subject more efficiently than ball screw mechanisms and rack-and-pinion mechanisms.

A conventional driving device includes a drive wheel, a driven wheel, a timing belt and a driving means. The drive wheel and the drive wheel are supported for rotation with their axes extended parallel to each other. A movable object is attached to the timing belt, and the timing belt is extended between the drive and the driven wheel. The driving means drives the drive wheel for rotation. The driving means controls the angular position of the drive wheel to move the movable object to a desired position.

The driving device is unable to move the movable object if the timing belt breaks after doing its term of service. The driving device remains inoperative and cannot perform a series of operations until the broken timing belt is replaced with a new one. Consequently, the working efficiency of the driving device decreases. If the timing belt extended vertically to move the movable object vertically breaks, the movable object will drop by its own weight and may possibly be damaged.

A prior art proposed to solve such a problem is proposed in Patent document 1. A power transmission device mentioned in Patent document 1 includes a drive wheel mounted on a rotating drive shaft, a driven wheel mounted on a rotating driven shaft extended parallel to the rotating drive shaft, and two parallel timing belts extended between the drive wheel and the driven wheel. Power is transmitted to the driven wheel by driving the drive wheel for rotation. The power transmission device is provided with a breakage detecting means for detecting the breakage of the timing belt. A brake is applied to the drive wheel to stop the drive wheel upon the detection of the breakage of either of the two timing belts by the breakage detecting means. Therefore, even if one of the two timing belts breaks, the other timing belt supports the movable object, such as a robot arm, to prevent the robot arm from falling down.

Patent Document 1: JP-A 2000-141274

The prior art power transmitting device is provided with the two timing belts. Therefore, the angular position of the driven wheel cannot be accurately controlled unless the two timing belts operate equally for power transmission and hence the tensions of the two timing belts need to be adjusted periodically to keep the two timing belts equally tensioned. Tension adjusting work for thus adjusting the respective tensions of the two timing belts cannot be easily carried out and requires much time. Although the breakage detecting means is capable of detecting the breakage of the timing belt, the same is incapable of estimating time when the timing belt may break and of preventing the breakage of the timing belts. Such problems arise when belt-like members other than belts are used. Belt-like members other than timing belts are long, flexible members at least wound round a drive wheel and include steel belts, V belts, chains and wires.

The timing belt is subject to flexure failure and the degree of flexure failure increases with time of use and the timing belt lengthens. The driving device provided with the prior art belt-drive mechanism is not provided with any means for measuring an elongation in the timing belt and hence the power transmitting device cannot be controlled on the basis of an elongation in the timing belt. Moreover, time when the timing belt will break cannot be predicted. Since an elongation in the belt cannot be measured, the belt is replaced with a new one before the belt breaks.

SUMMARY OF THE INVENTION

Accordingly, it is an object of the present invention to provide an elongation measuring device for measuring an elongation in a belt-like member included in a driving device.

An elongation measuring device in a first aspect of the present invention for measuring an elongation in a belt-like member included in a driving device having a rotating drive member supported for rotation about an axis, a rotative driving means for driving the rotating drive member for rotation, and the belt-like member wound round the rotating drive member and holding a movable object to be moved to a desired position includes: an angular position measuring means for measuring an angular position of the rotating drive member; a movable object detecting means for detecting the movable object positioned at a reference position on a path along which the movable object moves; and an arithmetic means for comparing an angular position of the rotating drive member at a present stage when the movable object is positioned at the reference position and an angular position of the rotative driving means at a past stage when the movable object was positioned at the same reference position a predetermined time before the present stage.

In the elongation measuring device according to the present invention, the rotating drive member is provided with a plurality of driving protrusions circumferentially arranged at intervals, the belt-like member is provided with a plurality of driven protrusions arranged at longitudinal intervals, the belt-like member is wound round the rotating drive member with the driving protrusions of the rotating drive member engaged with the driven protrusions of the belt-like member, respectively, and a plurality of reference positions are set at intervals on the path of the movable object.

In the elongation measuring device according to the present invention, the past stage corresponds to time when the belt-like member was initially installed in the driving device.

In the elongation measuring device according to the present invention, the past stage corresponds to time when an elongation in the belt-like member was measured in a preceding elongation measuring cycle.

A controller in a second aspect of the present invention for controlling the foregoing driving device includes: the foregoing elongation measuring device; and a driving signal generating means for generating a driving signal to be given to the rotative driving means; wherein the driving signal generating means corrects the driving signal on the basis of measured data provided by the elongation measuring device.

An elongation measuring and signaling device in a third aspect of the present invention for providing an elongation signal indicating an elongation in the belt-like member of the foregoing driving device includes: the foregoing elongation measuring device; and an elongation signal generating means for generating an elongation signal representing information about a measured elongation.

The elongation measuring and signaling device further includes an elongation comparing means for comparing a measured elongation with a predetermined allowable elongation; wherein the elongation signal generating means generates a signal indicating the result of comparison made by the elongation comparing means.

In the foregoing controller, an object of control is a driving device for driving a carrying mechanism for carrying a semiconductor wafer.

The belt-like member wound round the rotating drive member moves when the rotating drive member rotates. Then, the movable object moves along the predetermined path as the belt-like member moves. Thus the movable object is moved along the path by rotating the rotating drive member.

The elongation measuring device includes the angular position measuring means for measuring an angular position of the rotating drive member, and the movable object detecting means for detecting the movable object positioned at the reference position. Thus, the angular position of the rotating drive member at a moment the movable object moving along the path arrives at the reference position can be determined.

The arithmetic means compares an angular position of the rotating drive member at a present stage when the movable object is positioned at a reference position (hereinafter, referred to as "present angular position") and an angular position of the rotative driving means at a past stage when the movable object was positioned at the same reference position (hereinafter, referred to as "past angular position"). The difference between the present and the past angular position is caused by the elongation of the belt-like member. Therefore, an elongation in the belt-like member can be estimated by comparing the present and the past angular position.

According to the present invention, an elongation in the belt-like member can be measured by the cooperative function of the angular position measuring means, the movable object detecting means and the comparing means. For example, a measured elongation in the belt-like member can be an indication of the breakage of the belt-like member and the belt-like member can be replaced with a new one before the same breaks.

In most cases, the driving device includes an angular position measuring means. In such a case, the angular position measuring means of the driving device can be used also as the angular position measuring means of the elongation measuring device. When the angular position measuring means of the driving device is used also as the angular position measuring means of the elongation measuring device, the elongation measuring device needs to include only a movable object detecting means and a comparing means and does not need to include an angular position measuring means. Such an elongation measuring device is simple in construction and can be fabricated at a low cost.

According to the present invention, the rotating drive member is provided with the driving protrusions and the belt-like member is provided with the driven protrusions. The driving protrusions are engaged with the driven protrusions, respectively. The driving protrusions turn about the axis of the rotating drive member when the rotating drive member rotates. Since the driving protrusions are engaged with the driven protrusions, the driven protrusions move together with the rotating drive member as the driving protrusions move. The longitudinal interval between the adjacent driven protrusions increases when the belt-like member elongates. When the belt-like member elongates, the longitudinal movement of the belt-like member for the same angular displacement of the rotating drive member changes.

According to the present invention, the plurality of reference positions are set at intervals on the path of the movable object. In some cases, elongations in parts of the belt-like member are not necessarily the same. If elongations in parts of the belt-like member are not the same, the elongation corresponding to the difference between the present invention angular position and the past angular position when the movable object is at the reference position differ from that when the movable object is at another reference position. Suppose that the reference positions are first and second reference positions. Then, a first elongation corresponding to the difference between the present invention and the past angular position when the movable object is at the first reference position and a second elongation corresponding to the difference between the present invention and the past angular position when the movable object is at the second reference position differ from each other.

According to the present invention, the comparing means compares the elongations for the reference positions, such as the first and the second elongation, to determine a partial elongation in the belt-like member. Therefore, even if elongations in different parts of the belt-like member differ from each other, the elongation can be accurately measured.

As apparent from the foregoing description, according to the present invention, even if different parts of the belt-like member elongate differently, an elongation in the belt-like member can be accurately measured. For example, when the elongation measuring device gives accurate elongations in the belt-like member to the controller for controlling the driving device, the controller is able to move the movable object on the basis of the difference between the elongations.

According to the present invention, the past stage corresponds to time when the belt-like member was initially used. Therefore, an elongation in the belt-like member by which the belt-like member elongated in a period between the past stage when the belt-like member was initially used and the present stage can be determined. This elongation can be used for estimating time when the belt-like member may possibly break. Replacement of the belt-like member with a new one is timed on the basis of forecast time when the belt-like member may possibly break, and the worn belt-like member can be replaced with a new one before the same breaks.

According to the present invention, the past stage corresponds to time when an elongation in the belt-like member was measured in the preceding elongation measuring cycle. Therefore, an elongation in the belt-like member by which the belt-like member elongated in a period between the preceding elongation measuring cycle and the present stage can be determined. The elongation in the period between the preceding elongation measuring cycle and the present stage can be used for estimating breakage time when the belt-like member may possible break. Replacement of the belt-like member at a stage close to the breakage time with a new one can be timed on the basis of the forecast breakage time.

According to the present invention, the driving signal generating means generates a driving signal to move the movable object to a predetermined position and gives the driving signal to the rotative driving means. The rotative driving means drives the rotating drive member for rotation according to the driving signal to move the movable object to the predetermined position.

The driving signal is corrected on the basis of measured data provided by the elongation measuring device. Thus a driving signal corresponding to an elongation can be given to the rotative driving means and the movable object can be accurately positioned at a desired position. Thus positioning the movable object at a position different from the desired position can be prevented. Even if the belt-like member elongates, the operator does not need to give an instruction requesting correcting the angular position of the rotating drive member. The frequency of adjustment for compensating the elongation in the belt-like member can be reduced.

According to the present invention, the elongation measuring and signaling device includes the elongation signal generating means for generating an elongation signal indicating a measured elongation to inform the operator of the elongation. Therefore, the operator is able to recognize the condition of the belt-like member, to time the replacement of the belt-like member on the basis of information about the elongation, and to take proper measures.

According to the present invention, the elongation measuring and signaling device compares a measured elongation with a predetermined allowable elongation by the elongation comparing means and provides a signal indicating the result of comparison. Therefore, the operator is able to recognize the relation between the measured elongation and the allowable elongation. Thus the operator is able to recognize the condition of the belt-like member, to forecast time when the belt-like member may possibly break and to take proper measures.

According to the present invention, the controller controls the driving device for carrying a semiconductor wafer as the movable object. The semiconductor wafer needs to be accurately positioned at a desired position. Since the angular position of the rotating drive member is corrected according to the elongation in the belt-like member the semiconductor wafer can be accurately positioned at a desired position. The semiconductor wafer is liable to be damaged by external force. The accurate positioning of the semiconductor wafer at the desired position is effective in preventing the semiconductor wafer from being damaged.

In most cases, the semiconductor wafer is carried in a clean room. Since the frequency of adjustment to compensate for the elongation of the belt-like member is reduced, the driving device does not adjusted frequently and hence the possibility of contaminating the clean room can be reduced.

DESCRIPTION OF THE PREFERRED EMBODIMENTS

Figure 1:
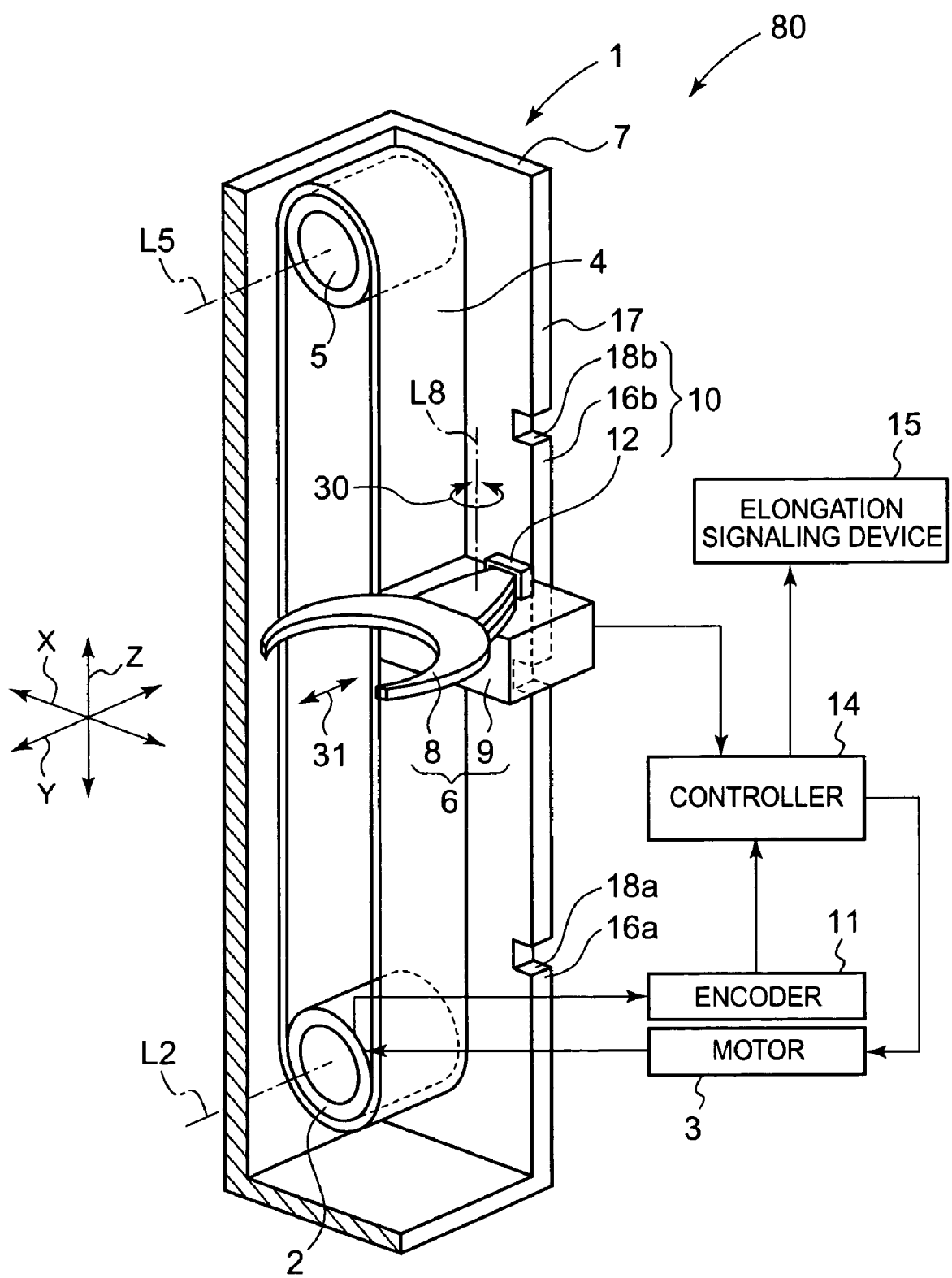
FIG. 1 is a schematic perspective view of a lifting apparatus 80 related with the present invention.
Figure 2:
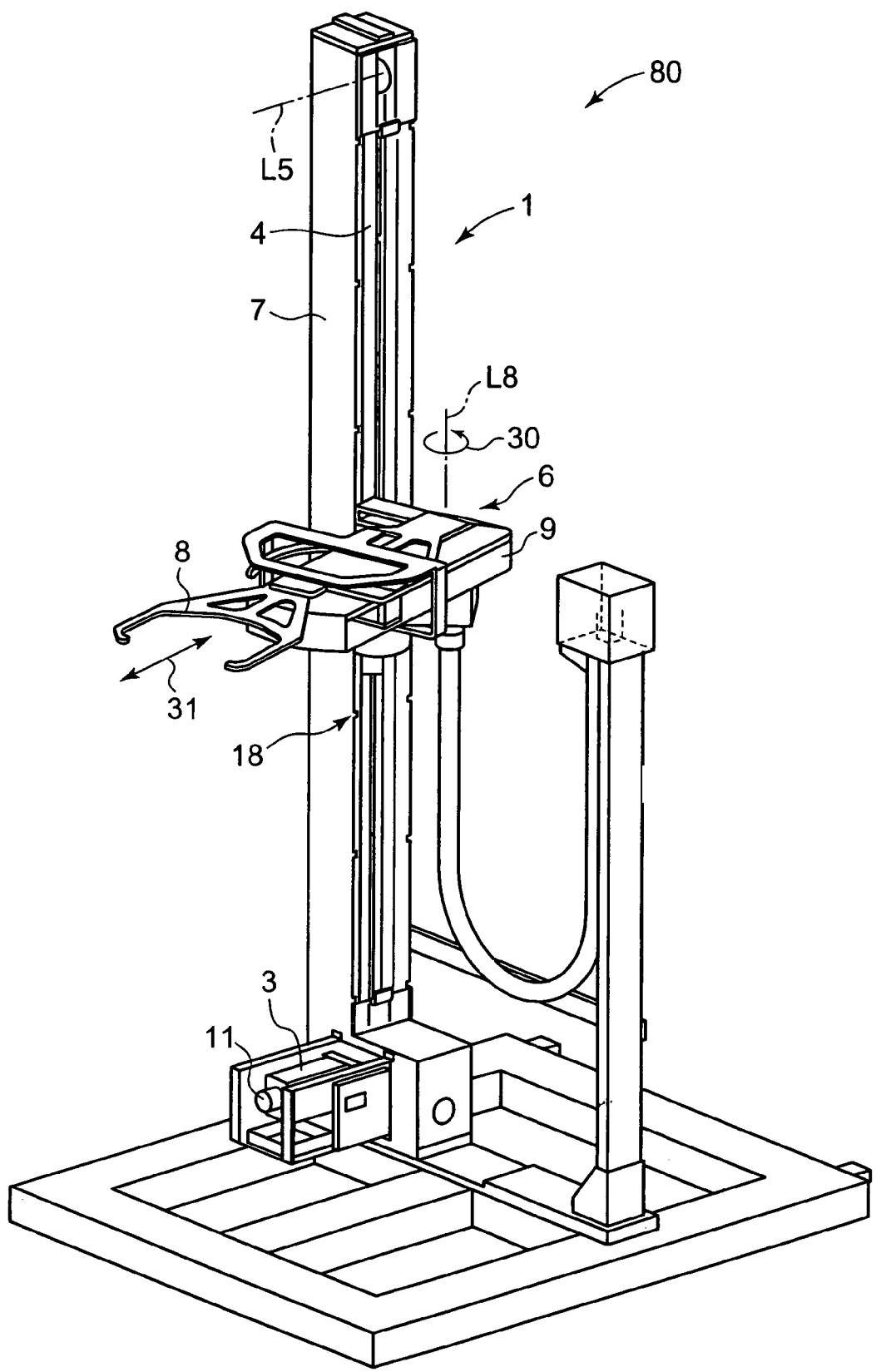
FIG. 2 is a perspective view of the lifting apparatus 80 shown in FIG. 1.

FIG. 1 is a schematic perspective view of a lifting apparatus 80 related with the present invention and FIG. 2 is a perspective view of the lifting apparatus 80 shown in FIG. 1. The lifting apparatus 80 includes a driving device 1 for vertically moving a hand unit 6, namely, an object to be moved, a controller 14 for controlling the driving device 1, an elongation measuring device 10 in a preferred embodiment according to the present invention, and an elongation measuring and signaling device provided with an elongation signaling device 15. The lifting apparatus 80 carries a semiconductor wafer, namely, an object to be moved, in vertical directions.

The driving device 1 includes a drive roller 2, a motor 3, a timing belt 4, namely, a belt-like member, a driven roller 5 and a frame 7. The frame is fixedly installed at a predetermined position to support rotatably the drive roller 2 and the driven roller 5. The frame 7 is a vertically long member. More specifically, the frame 7 is a bottomed tubular member having a substantially U-shaped cross section in a plane perpendicular to the length of the frame 7.

In this specification, an axis perpendicular to the longitudinal axis of the frame 7 is called a first axis Z, an axis perpendicular to the first axis Z is called a second axis X and an axis perpendicular to both the first axis Z and the second axis X is called a third axis Y. The first Z is vertical. The second axis X and the third axis Y are contained in a horizontal plane. In this specification, the term "turn" signifies both an angular displacement through an angle below 360° and that through an angle not smaller than 360°.

The drive roller 2, namely, a rotating drive member, is formed in a cylindrical shape. The drive roller 2 is supported on the frame 7 so as to rotate about a first axis L2 coinciding with the axis of the drive roller 2 and parallel to the second axis X. The drive roller 2 is supported on a lower part of the frame 7.

The driven roller 5, namely, a rotating driven member, is formed in a cylindrical shape. The driven roller 5 is supported on the frame 7 so as to rotate about a second axis L5 coinciding with the axis of the driven roller 5 and parallel to the second axis X. The driven roller 5 is supported on an upper part of the frame 7.

The timing belt 4, namely, a belt-like member, is an endless flexible belt. The timing belt 4 is extended between the drive roller 2 and the driven roller 5 so that the timing belt 4 may not slip relative to the drive roller 2.

The hand unit 6, namely, a movable object, is attached to the timing belt 4. The hand unit 6 is able to support a semiconductor wafer thereon. The hand unit 6 has a base member 9 and a support member 8. The base member 9 is fixed to the timing belt 4. The support member 8 is connected to the base member 9. The upper surface of the support member 8 is a support surface for supporting a semiconductor wafer thereon.

The support member 8 is turnable on the base member 9 in a turning direction 30 about an axis L8 parallel to the first axis Z. The support member 8 can be moved in directions 31 perpendicular to the axis L8 relative to the base member 9.

The driving device 1 has a turning driving unit for turning the support member 8 in the directions 30 relative to the base member 9 and a translating driving unit for translating the support member 8 relative to the base member 9 in the directions 31.

The motor 3, namely, a driving means, drives the drive roller 2 for rotation. The motor 3 has an output shaft connected directly or indirectly to the drive roller 2. The output shaft transmits the output torque of the motor 3 to the drive roller 2. For example, the output torque of the motor 3 is transmitted to the drive roller 2 through a power transmitting mechanism, such as a gear train. In this embodiment, the motor 3 is a servomotor. The motor 3 is provided with a built-in encoder 11 serving as a component of an angular position measuring device for measuring the angular position of the output shaft. The encoder 11 gives encoder information to the controller 14. The encoder information contains pulses. The encoder 11 generates a fixed number of pulses for every one turn of the output shaft. An angular displacement of the output shaft from the home position of the output shaft is represented by a number of pulses. Thus the angular position of the output shaft can be determined by counting the number of pulses generated by the encoder 11.

The controller 14 gives a driving signal to the motor 3 to turn the output shaft of the motor 3 to a predetermined angular position. The controller 14 receives the encoder information about an angular position of the output shaft from the encoder 11. The controller 14 generates a driving signal on the basis of the encoder information to control the motor 3 in a feedback control mode. Thus the controller 14 is able to control the motor 3 to turn the output shaft of the motor accurately to a predetermined angular position. The controller 14 is capable of controlling the rotating drive unit and the translating drive unit to move the support member 8 to a predetermined position.

The controller 14 is, for example, a robot controller. The controller 14 includes a storage unit storing predetermined programs and results of arithmetic operations, an arithmetic unit capable of reading information from and writing information to the storage unit and of executing the programs stored in the storage unit, an output unit for providing results of arithmetic operations, and an input unit for receiving information necessary for arithmetic operations.

The storage unit is, for example, a ROM (read-only memory) or a RAM (random-access memory). The arithmetic unit is, for example, a CPU (central processing unit). The input unit and the output unit are, for example, an input/output interface.

The controller 14 controls the motor 3 of the driving device 1 to drive the drive roller 2 for rotation. The drive roller 2 turns the timing belt 4. Consequently, the hand unit 6 moves along the path of the timing belt 4. The hand unit 6 moves in one of opposite directions parallel to the first axis Z when the drive roller 2 rotates in one of opposite directions and moves in the other direction parallel to the first axis Z when the drive roller 2 rotates in the other direction.

Figure 3:
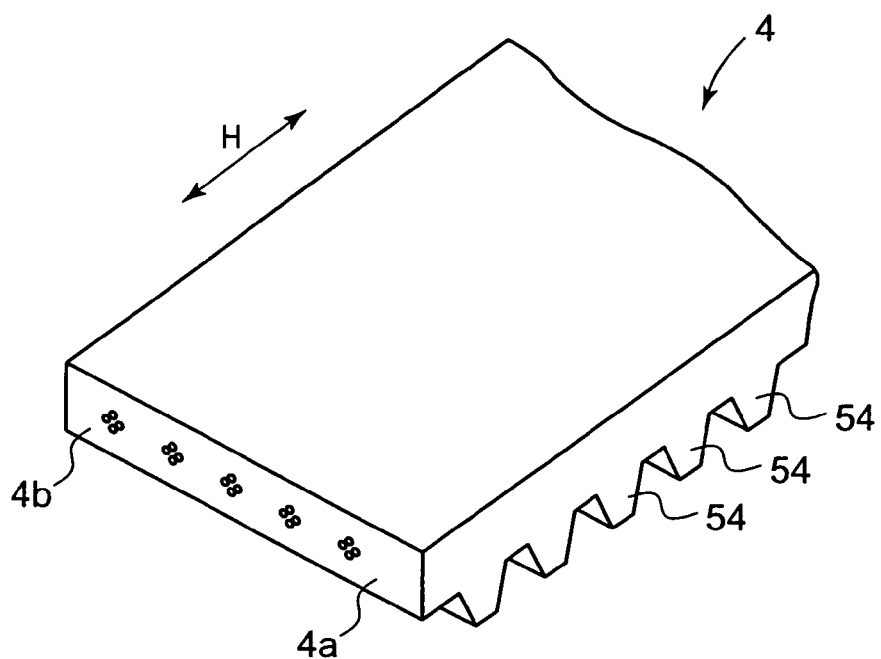
FIG. 3 is an enlarge, fragmentary perspective view of a timing belt 4.

FIG. 3 is an enlarged, fragmentary perspective view of the timing belt 4. Shown in FIG. 3 is a section in a plane perpendicular to longitudinal directions H. The timing belt 4 is provided on its underside with evenly spaced teeth 54, namely, driven protrusions. The teeth 54 have the same shape and are arranged at equal pitches P2.

The timing belt 4 is formed of flexible materials. Preferably, the timing belt 4 has high rigidity. The timing belt 4 has a belt body 4*a* provided with the teeth 54, and a plurality of cords 4*b* embedded in the belt body 4*a*. The belt body 4*a* is formed of, for example, a synthetic resin, such as a polyurethane resin. The cords 4*b* are formed of, for example, a steel.

Figure 4:
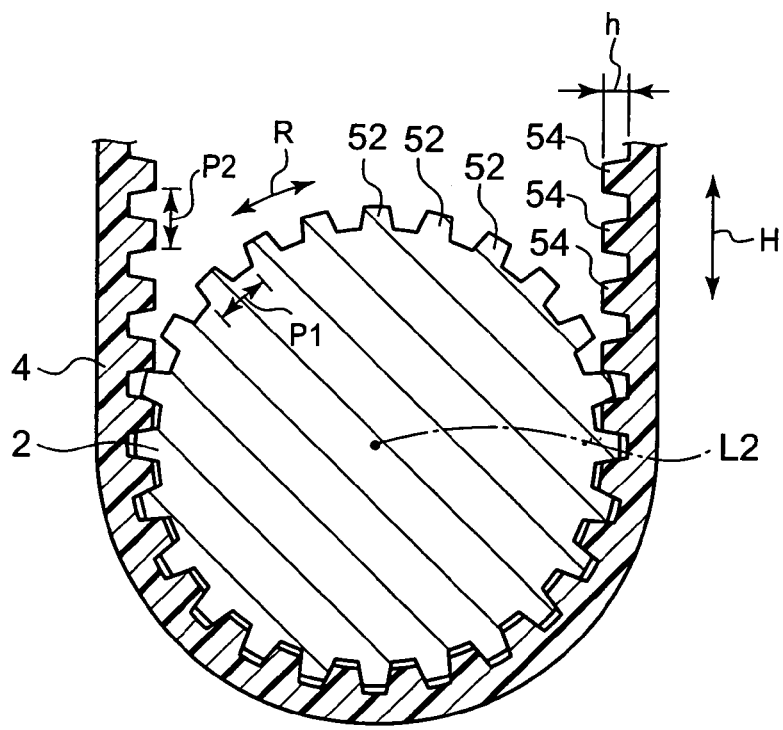
FIG. 4 is a sectional view of the timing belt 4 and a drive roller 2.

FIG. 4 is a sectional view of the timing belt 4 and the drive roller 2. The drive roller 2 is provided in its circumference with a plurality of evenly spaced, radially protruding teeth 52, namely, driving protrusions. The teeth 52 are arranged at equal pitches P1 in a circumferential direction R. The teeth 52 have the same shape.

The timing belt 4 is wound round the drive roller 2 such that the timing belt 4 is in contact with part of the circumference of the drive roller 2 and some of the driven teeth 54 thereof are engaged with some of the driving teeth 52 of the drive roller 2. Thus the timing belt 4 runs substantially without slipping relative to the drive roller 2 when the drive roller 2 is rotated.

Figure 5:
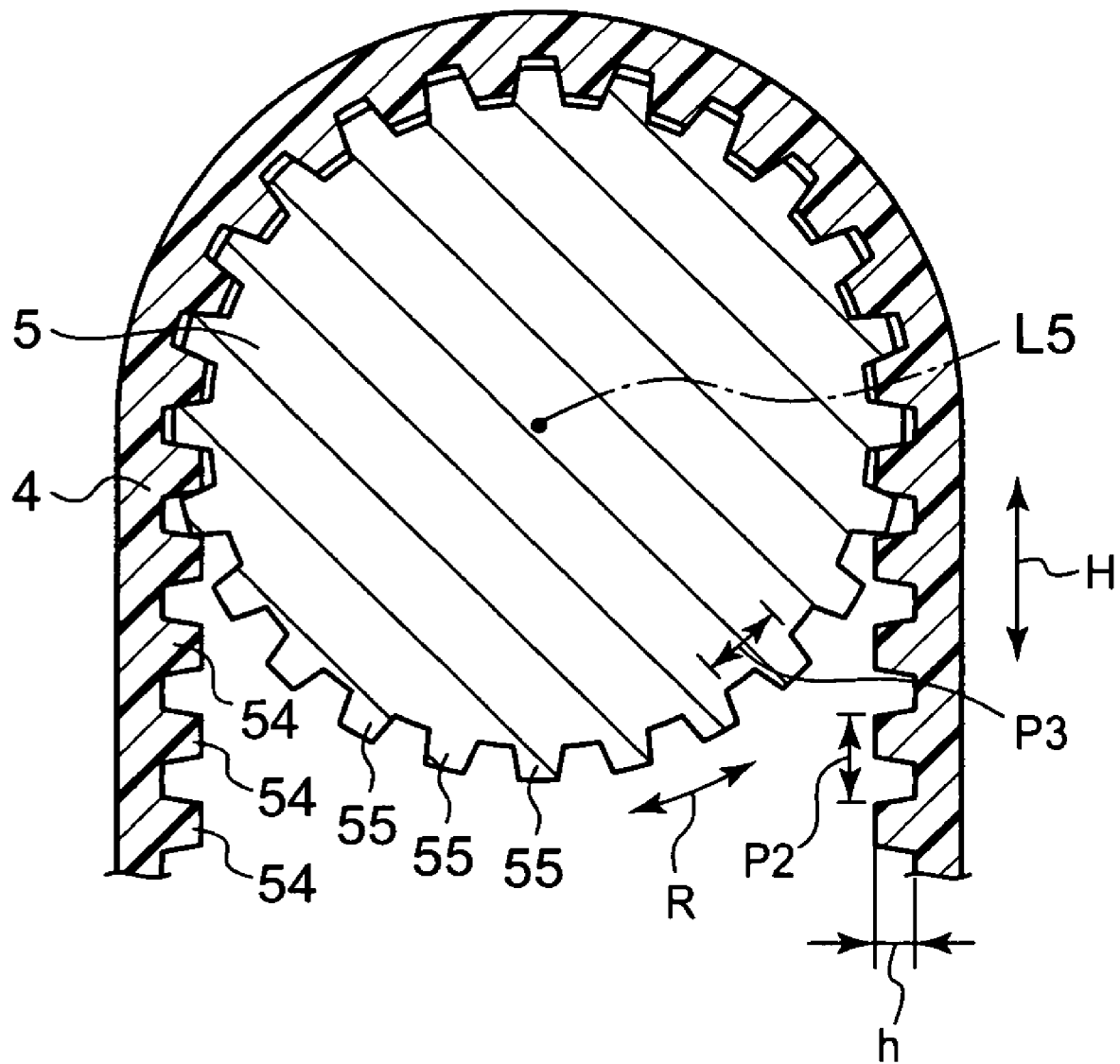
FIG. 5 is a sectional view of the timing belt 4 and a driven roller 5.

FIG. 5 is a sectional view of the timing belt 4 and the driven roller 5. The driven roller 5 is provided in its circumference with a plurality of evenly spaced, radially protruding teeth 55, namely, driven protrusions. The shape of the teeth 55 is substantially the same as that of the driving teeth 52. The teeth 55 are arranged at equal pitches P3 in a circumferential direction R.

The timing belt 4 is wound round the driven roller 5 such that the timing belt 4 is in contact with part of the circumference of the driven roller 5 and some of the teeth 54 thereof are engaged with some of the driven teeth 55 of the driven roller 5. As the timing belt 4 runs, the driven roller 5 is turned substantially without slipping relative to the timing belt 4. The shapes of the driving teeth 52, the teeth 54 and the driven teeth 55 shown in FIGS. 4 and 5 are only examples; the driving teeth 52, the teeth 54 and the driven teeth 55 may be formed in any suitable shapes provided that the timing belt 4 is able to engage operatively with parts of the drive roller 2 and the driven roller 5.

Since the teeth 54 of the timing belts engage with the driving teeth 52 and the driven teeth 55, the timing belt 4 runs and the driven roller 5 rotates according to the rotation of the drive roller 2 when the drive roller 2 is driven for rotation. The timing belt 4 runs substantially without slipping relative to the drive roller 2. Consequently, the position of the hand unit 6 on the traveling path can be controlled by controlling the angular position of the drive roller 2.

The hand unit 6 is moved for displacement in vertical directions parallel to the first axis Z. The support member 8 is moved in the directions 31 and is turned in the turning direction 30 relative to the base member 9. Thus the support member 8 can be three-dimensionally moved.

The controller 14 advances the support member 8 toward a container, such as a cassette, containing semiconductor wafers to take out the semiconductor wafer from the container. The controller 14 advances the support member 8 supporting a semiconductor wafer thereon to the container to put the semiconductor wafer on a shelf formed in the container.

Figure 6:
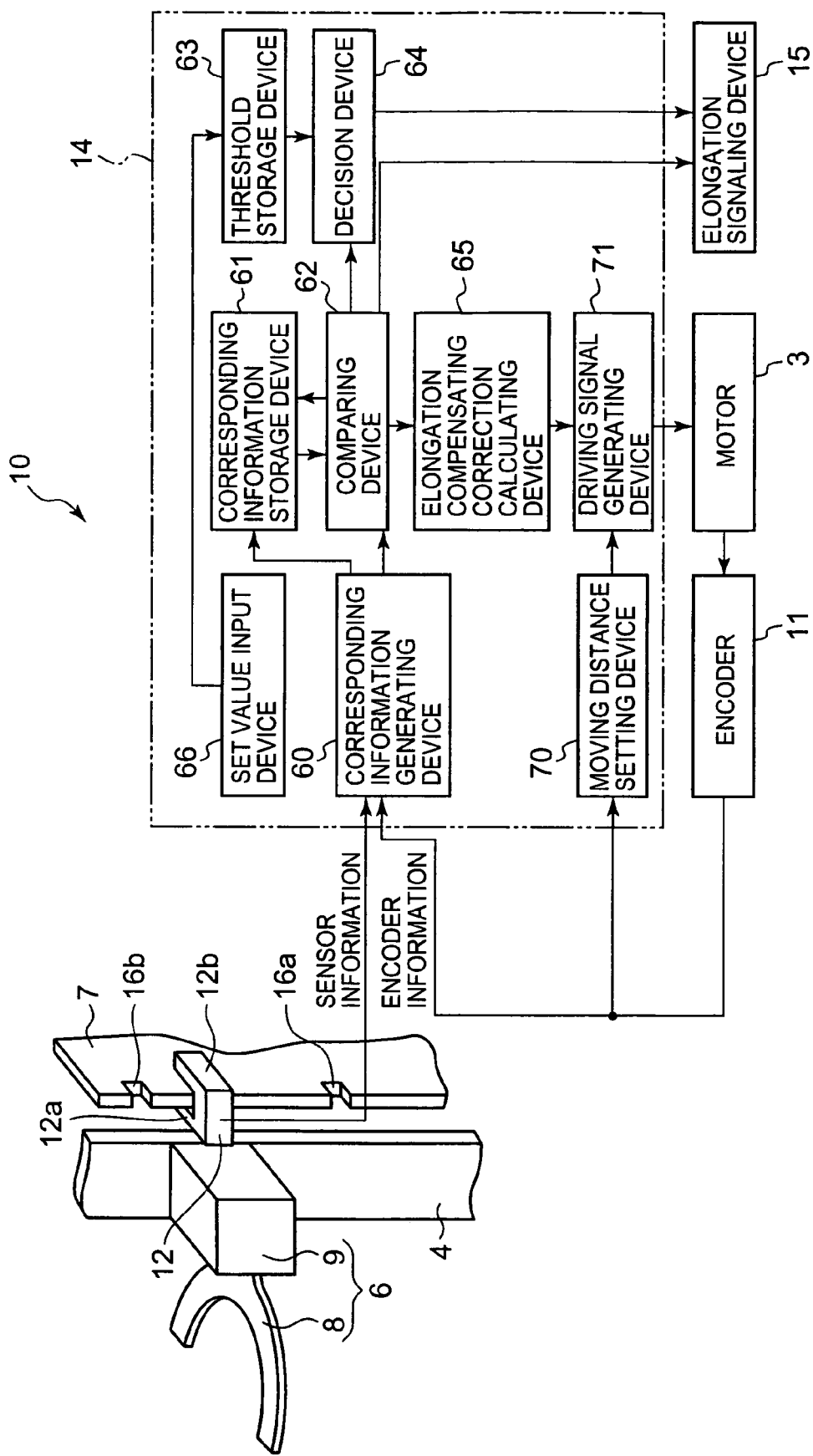
FIG. 6 is a block diagram of the elongation measuring device 10 shown in FIG. 1.

FIG. 6 is a block diagram of the elongation measuring device 10 shown in FIG. 1. The lifting apparatus 80 is provided with the elongation measuring device 10. The elongation measuring device 10 measures an elongation in the timing belt 4. The elongation measuring device 10 has an angular position measuring device for measuring the angular position of the drive roller 2 or the driven roller 5, a hand unit position finding device for finding the positional condition of the hand unit 6, and an arithmetic unit for calculating an elongation in the timing belt 4 on the basis of data provided by the angular position measuring device and the positional condition measuring unit.

The encoder 11 is used as both a device for measuring the angular position of the output shaft of the motor 3 and the angular position measuring device. The hand unit position finding device includes, for example, a microphotosensor 12. The controller 14 serves also as the arithmetic unit of the elongation measuring device 10.

As mentioned above, the built-in encoder 11 of the motor 3 of the driving device 1 serves also as the angular position measuring device of the elongation measuring device 10. The encoder 11 gives encoder information about the angular position of the output shaft of the motor 3 to the controller 14.

The hand unit position finding device finds the position of the hand unit 6. When the hand unit 6 arrives at either of reference positions 16a and 16b on the path of the hand unit 6 respectively indicated by position indicating parts 18a and 18b formed in a position indicating wall 17 of the frame 7, the hand unit position finding device gives an arrival signal indicating the arrival of the hand unit 6 at the reference position 16a or 16b to the controller 14. The reference positions 16a and 16b are fixed regardless of the movement of the hand unit 6. At least two reference positions are set at known intervals on the path of the hand unit 6. If three or more reference positions are set, the three or more reference positions are arranged on the path, for example, at equal known intervals. The intervals do not necessarily need to be equal, provided that the intervals are known intervals.

The microphotosensor 12 of the hand unit position finding device is mounted on the hand unit 6. The microphotosensor 12 detects the position indicating parts 18a (18b) indicating the reference position 16a (16b). Upon the arrival of the hand unit 6 at the reference position 61a (16b), the microphotosensor 12 gives a sensor signal indicating that the hand unit 6 has arrived at the reference position 16a (16b) to the controller 14. Then, the controller 14 decides that the hand unit 6 is at the reference position 16a (16b). The position indicating wall 17 provided with the position indicating parts 18a and 18b is fixedly set at the predetermined position. The position indicating wall 17 is parallel to the first axis Z and faces the timing belt 4.

For example, the position indicating parts 18a and 18b are cuts formed in the position indicating wall 17. If the frame 7 does not have any part suitable for use as the position indicating wall 17, the driving device 1 may be additionally provided with a position indicating member.

The hand unit position finding device capable of detecting the position indicating parts 18a and 18b is mounted on the base member 9. The microphotosensor 12 included in the hand unit position finding device is a transmission-type microphotosensor. The transmission-type microphotosensor 12 has a light emitter 12a and a light receiver 12b. The light emitter 12a emits light toward the position indicating wall 17. Upon the reception of the light emitted by the light emitter 12a, the light receiver 12b gives sensor information to the controller 14.

When the hand unit 6 is at the reference position 16a (16b), the light emitted by the light emitter 12a travels through the reference position indicating part 18a (18b) and falls on the light receiver 12b. Thus the light receiver 12b detects the light emitted by the light emitter 12a.

When the hand unit 6 is at a position other than the reference positions 16a and 16b, light emitted by the light emitter 12a is intercepted by the position indicating wall 17 and is unable to fall on the light receiver 12b. Consequently, the light receiver 12b is unable to detect the light emitted by the light emitter 12a.

When the quantity of light detected by the light receiver 12b is smaller than a predetermined threshold quantity of light, the controller 14 decides that the hand unit 6 is at a position other than the reference positions 16a and 16b. When the quantity of light detected by the light receiver 12b is larger than the predetermined threshold quantity of light, the controller 14 decides that the hand unit 6 is at the reference position 16a or 16b.

Thus the controller estimates the quantity of light received by the light receiver 12b on the basis of the sensor information to decide whether or not the hand unit 6 is at either of the reference positions 16a and 16b. The arrival of the hand unit 6 at either of the reference positions 16a and 16b can be known from the sensor signal provided by the single microphotosensor 12 mounted on the hand unit 6 and hence additional parts are not necessary.

Sensors may be disposed at the reference positions 16a and 16b, and the hand unit 6 may be provided with an object to be detected by the sensors. Since the sensors do not move together with the hand unit 6, the sensors can be easily connected to the controller 14.

The foregoing hand unit position finding device is only an example and a hand unit position finding device of any other suitable construction may be used. The hand unit position finding device may be provided with any type of sensors, provided that the sensors are able to find the arrival of the hand unit 6 at the reference position accurately. Preferably, the hand unit position finding device is provided with a noncontact sensor, such as a reflection-type microphotosensor, a magnetic sensor or an ultrasonic sensor.

As shown in FIG. 6, the controller 14 is provided with a moving distance setting device 70 and a driving signal generating device 71 for controlling the motor 3. The moving distance setting device 70 sets a distance for which the hand unit 6 is to be moved and gives the set distance to the driving signal generating device 71. For example, the moving distance setting device 70 determines a desired position to which the hand unit 6 is to be moved, and determines a moving distance on the basis of the encoder information provided by the encoder 11. The driving signal generating device 71 generates a driving signal for driving the motor 3 on the basis of the moving distance set by the moving distance setting device 70. The controller 14 gives the driving signal to the motor 3.

The controller 14 includes a corresponding information generating device 60, a corresponding information storage device 61 and a comparing device 62, which are the components of the elongation measuring device 10 for measuring an elongation in the timing belt 4. The controller includes a threshold storage device 63, a decision device 64 and a set value input device 66, which are the components of the elongation measuring and signaling device.

The corresponding information generating device 60 receives sensor information from the microphotosensor 12 and encoder information from the encoder 11, and generates encoder information in a state where the hand unit 6 is positioned at the reference position 16a (16b) as corresponding information. The corresponding information is about the angular position of the drive roller 2 in a state where the hand unit 6 is positioned at the reference position 16a (16b). The corresponding information generating device 60 gives the generated corresponding information to the corresponding information storage device 61 and the comparing device 62. The corresponding information storage device stores the corresponding information received from the corresponding information generating device 60 as past corresponding information at a past stage.

The comparing device 62 regards the corresponding information received from the corresponding information generating device 60 as present corresponding information at the present stage. The comparing device 62 reads the past corresponding information from the corresponding information storage device 61 and compares the present and the past corresponding information.

Thus the comparing means 62 those pieces of corresponding information to compare the angular position of the drive roller 2 when the hand unit 6 is positioned at the reference position 16 at the present stage, namely, present angular position, and the angular position of the drive roller 2 when the hand unit 6 was positioned at the reference position 16 at a past stage a predetermined time before the present state, namely, past angular position.

The difference between the present and the past angular position is caused by the elongation of the timing belt 4. Thus an elongation in the timing belt 4 can be measured by comparing the present and the past angular position by the comparing device 62. The present stage is a present inspection stage when the latest inspection of the timing belt 4 is made. The past stage is an initial inspection stage when the new timing belt 4 was inspected for the first time. Corresponding information obtained when the timing belt 4 was inspected for the first time is stored in the corresponding information storage device 61.

For example, when an elongation measuring operation is performed periodically, the past stage may be a stage when the preceding cycle of the elongation measuring operation was performed. In this case, corresponding information provided during the preceding cycle of the elongation measuring operation is stored in the corresponding information storage device 61.

Figure 7:
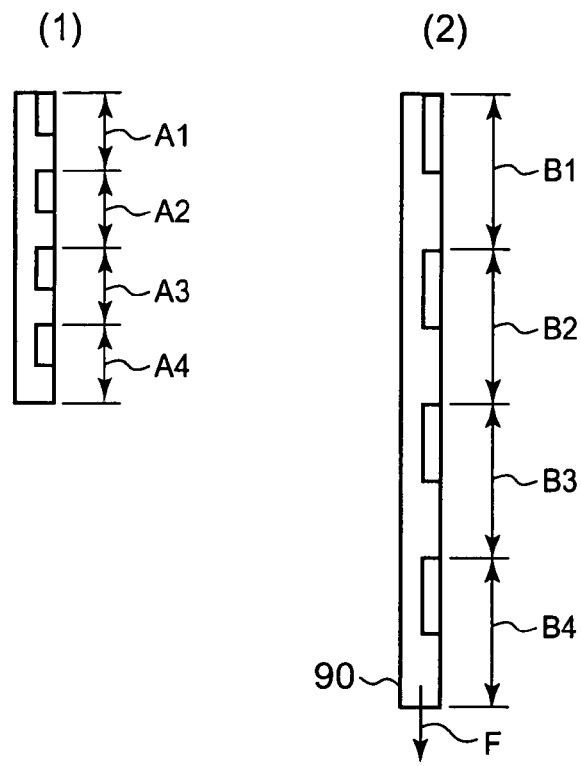
FIGS. 7(1) and 7(2) are exaggerated front elevations of the timing belt 4 at a past stage and the timing belt 4 at a present stage, respectively.

FIGS. 7(1) and 7(2) are exaggerated, typical front elevations of the timing belt 4 at a past stage and the timing belt 4 at a present stage a long time after the past stage, respectively.

As shown in FIG. 7(1), the teeth of the new timing belt 4 extended between the drive roller 2 and the driven roller 5 are arranged at equal pitches A1 to A4 at an initial stage of use. Since tensile force F is exerted on the timing belt 4 during operation, the timing belt 4 used for a long time is stretched. Consequently, the teeth of the used timing belt 4 are arranged at pitches B1 to B4, which are greater than the pitches A1 to A4, respectively.

Figure 8:
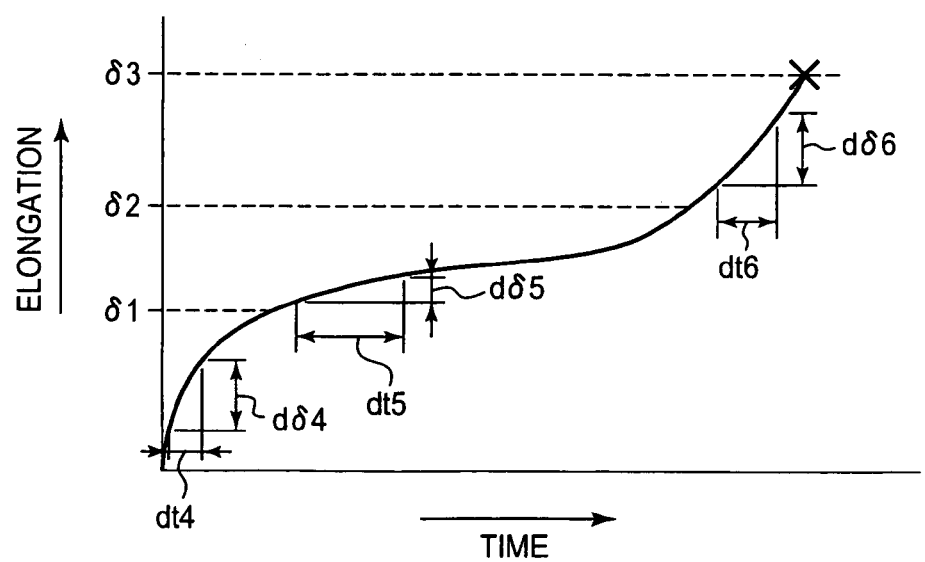
FIG. 8 is a graph showing the change of elongation in the timing belt 4 with time.

FIG. 8 is a graph showing the change of elongation $\delta$ in the timing belt 4 with time. The timing belt 4 elongates with the passage of working time owing to three causes. A first cause is the compaction and elongation of the cords 4b caused by the tensile force F and the resultant elongation of the timing belt 4. A second cause is the apparent elongation of the timing belt 4 due to the abrasion of the teeth 52, 54 and 55. A third cause is the breakage of the cords 4b due to bending fatigue and the resultant increase in stress induced in the timing belt 4. Those causes cause the timing belt 4 elongate with the passage of working time at elongation rate $d\delta/dt$.

The timing belt 4 elongates by a predetermined first set elongation $\delta 1$ owing mainly to the first and the third cause. After an elongation in the timing belt 4 increases beyond the first set elongation $\delta_1$, an elongation in the timing belt 4 increases to a second set elongation $\delta_2$ owing to the first, the second and the third cause. A second elongation rate $d\delta_5/dt_5$ at which the elongation increases from the first set elongation $\delta_1$ to the second set elongation $\delta_2$ is lower than a first elongation rate $d\delta_4/dt_4$ at which the timing belt 4 elongates at an initial stage of use. As the working time increases, the timing belt 4 elongates owing mainly to the second and the third cause. Upon the increase of the elongation to a critical elongation $\delta_3$, the timing belt 4 breaks. A third elongation rate $d\delta_6/dt_6$ at which the elongation increases from the second set elongation $\delta_2$ to the critical elongation $\delta_3$ is higher than the second elongation rate $d\delta_5/dt_5$.

The life of the timing belt 4 is dependent on the condition of use and working environment. Therefore, in some cases, the actual life of the timing belt 4 differs from the nominal life of the same.

Figure 9:
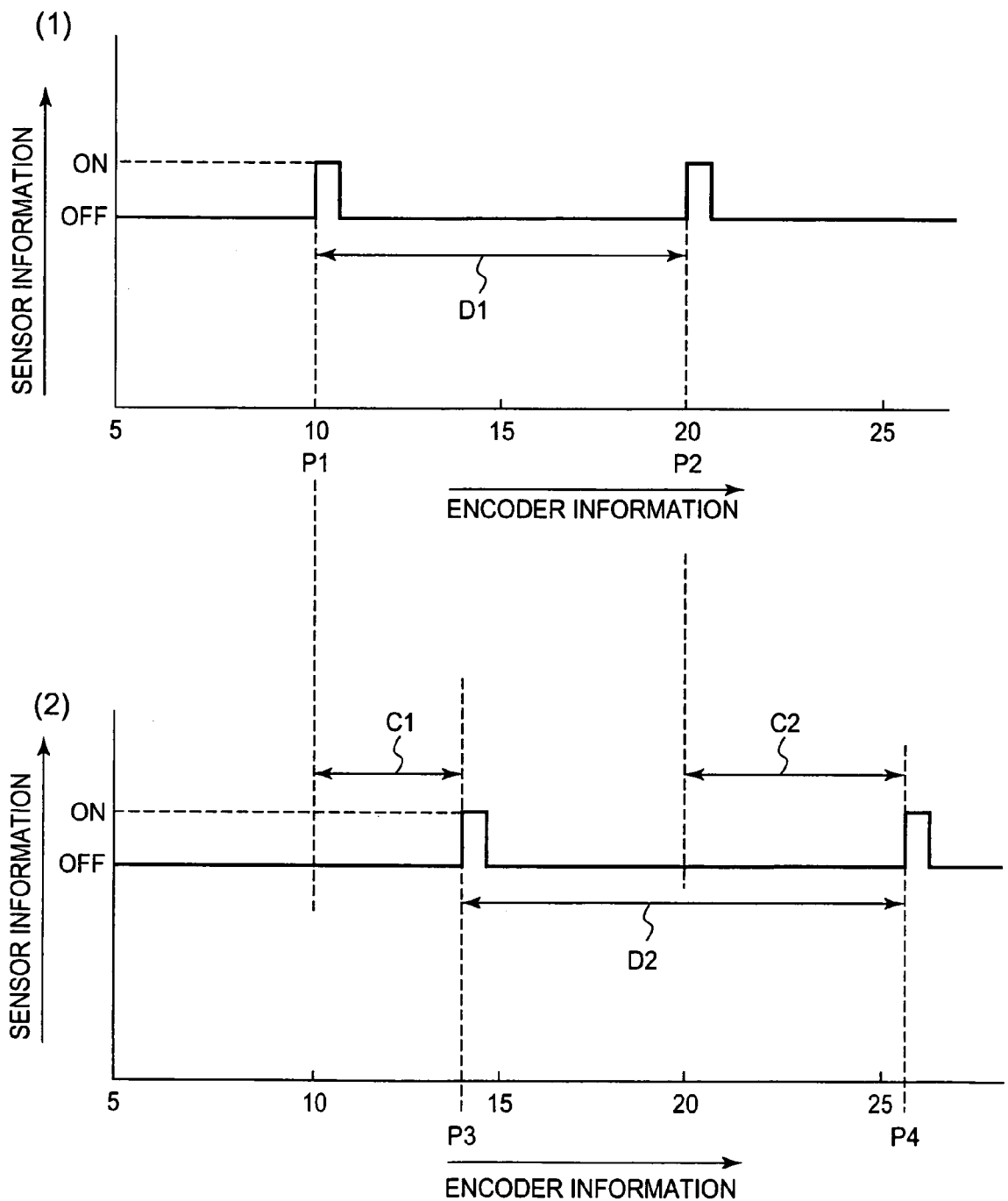
FIGS. 9(1) and 9(2) are graphs showing the relation between measured data measured by a microphotosensor 12 and measured data measured by an encoder 11.

FIGS. 9(1) and 9(2) are graphs showing the relation between measured data measured by a microphotosensor 12 and measured data measured by the encoder 11. FIG. 9(1) shows measured data measured when the timing belt 4 is new and FIG. 9(2) shows measured data measured after the timing belt 4 has been used for a working time. Pulses shown in FIGS. 9(1) and 9(2) are sensor information pulses generated by the microphotosensor 12 at the passage of the hand unit 6 past the first reference position 16a and the second reference positions 16b.

Encoder information about the angular position of the rive roller 2 is measured on the horizontal axis in FIGS. 9(1) and 9(2). In FIGS. 9(1) and 9(2), the encoder information is the number of pulses generated after the output shaft of the motor 3 started turning from its home position.

Sensor information provided by the light receiver 12b is measured on the vertical axis. More specifically, the quantity of light received by the light receiver 12b exceeds the threshold and a signal generated by the light receiver 12b, namely, sensor information, goes ON when the hand unit 6 arrives at the reference position 16a (16b), and the quantity of light received by the light receiver 12b is below the threshold and a signal generated by the light sensor 12b goes OFF when the hand unit 6 is at a position other than the reference positions 16a and 16b.

At the initial stage of use of the timing belt 4, elongation in the timing belt 4 is zero. For example, the encoder 11 generates ten pulses while the drive roller 2 is turned from its home position to a first angular position P1 to position the hand unit 6 at the first reference position 16a, and the encoder 11 generates twenty pulses while the drive roller 2 is turned from its home position to a second angular position P2 to position the hand unit 6 at the second reference position 16b as shown in FIG. 9(1) at the initial stage of use of the timing belt 4. A first angular position difference D1 at the initial stage of use, namely, the difference between the first angular position P1 represented by ten pulses and the second angular position P2 represented by twenty pulses, is represented by ten pulses.

As mentioned above, the timing belt 4 elongates as the same is used for a working time. Therefore, the encoder 11 generates, for example, fourteen pulses while the drive roller 2 is turned from its home position to a first angular position P3 to position the hand unit 6 at the first reference position 16a, and the encoder 11 generates, for example, twenty-six pulses while the drive roller 2 is turned from its home position to a second angular position P4 to position the hand unit 6 at the second reference position 16b as shown in FIG. 9(2) after the timing belt 4 has been used for a working time.

In FIGS. 9(1) and 9(2), a first elongation C1 corresponds, for example, to four pulses and a second elongation C2 corresponds, for example, to six pulses. Therefore, a second angular position difference D2 at a working stage, namely, the difference between the first angular position P3 of the drive roller 2 when the hand unit 6 is positioned at the first reference position 16a and the second angular position P4 of the drive roller 2 when the hand unit 6 is positioned at the reference position 16b, is expressed by: D2=D1+C2−C1. In the example shown in FIGS. 9(1) and 9(2), the second angular position difference D2 corresponds to twelve pulses.

An elongation in the timing belt 4 can be determined by measuring the first angular positions P1 and P3 for positioning the hand unit 6 at the first reference position 16a, and the second angular positions P2 and P4 for positioning the hand unit 6 at the second reference position 16b.

The elongation measuring device 10 in this embodiment including the controller 14 including the comparing device 12, the encoder 11 serving as a component of an angular position measuring device, and the microphotosensor 12 included in the hand unit position finding device is capable of measuring an elongation in the timing belt 4. The measured elongation in the timing belt 4 is an indication of breakage of the timing belt 4. The timing belt 4 can be replaced with a new one before the timing belt 4 breaks by informing the operator of the indication of the expected breakage of the timing belt 4.

As mentioned above, the encoder 11 serving as a component of an angular position measuring device, included in the elongation measuring device 10 in this embodiment is built in the motor 3. The controller 14 serves also as arithmetic means for calculating an elongation of the elongation measuring device 10. Therefore, the elongation measuring device 10 can be built only by using a position measuring means and changing operation programs to be executed by the controller 14. The elongation measuring device 10 for measuring an elongation in the timing belt 4 has simple construction and can be fabricated at a low cost.

Since the encoder 11 incorporated into the motor 3 is a rotary encoder, the elongation measuring device 10 can be formed in a small size even if the drive roller 2 and the driven roller 5 are spaced a long distance apart with respect to a direction parallel to the first axis Z. Since the hand unit position finding device can be formed simply by mounting the microphotosensor 12 on the hand unit 6, the driving device 1 does not need to be modified to a considerable degree to include the microphotosensor 12. Thus, the elongation measuring device 10 can be readily incorporated into the existing lifting apparatus 80.

Although the position indicating parts 18a and 18b are cuts formed in the position indicating wall 17 in this embodiment, any suitable means may be used as the position indicating parts 18a and 18b. For example, if a reflection-type photosensor is employed, the optical reflectance of the surface of the position indicating wall 17 may be reduced and reflective sheets may be attached to parts, corresponding to the reference positions, of the position indicating wall 17. The elongation measuring device can be fabricated at a very low cost by thus designing the hand unit position finding device.

Preferably, the reference positions 16a and 16b ate on the path along which the hand unit 6 moves to carry a semiconductor wafer. Measurement of an elongation in the timing belt 4 can be achieved whenever necessary while the lifting apparatus 80 is in operation to move a semiconductor wafer vertically and hence any special elongation measuring operation does not need to be performed. Therefore, the semiconductor wafer carrying operation does not need to be stop for elongation measurement and hence the working efficiency of the lifting apparatus 80 can be improved.

When three or more reference positions 16 are set, the accuracy of elongation measurement can be improved by arranging the reference positions 16 at equal intervals.

The driving signal generating unit 71 of the controller 14 may correct a driving signal on the basis of measured data provided by the elongation measuring device 10. To correct a driving signal, the controller 14 is provided with an elongation compensating correction calculating device 65 as shown in FIG. 6.

The comparing device 62 gives a measured elongation in the timing belt 4 to the elongation compensating correction calculating device 65. Then, the elongation compensating correction calculating device 65 calculates an elongation compensating correction corresponding to the measured elongation and gives the elongation compensating correction to the driving signal generating device 71. Then, the driving signal generating device 71 corrects a driving signal on the basis of the elongation compensating correction. Thus, the controller 14 is able to adjust the mode of driving the motor 3 on the basis of the elongation in the timing belt 4. Consequently, the hand unit 6 can be moved to the predetermined desired position regardless of the elongation of the timing belt 4.

A procedure to be carried out by the elongation compensating correction calculating device 65 will be described more specifically. An elongation $\delta$ in the timing belt 4 is proportional to the initial length of the timing belt 4. An elongation ratio is the ratio of an elongation $\delta$ in the timing belt 4 to the initial length of the timing belt 4. The first reference position 16a and the second reference position 16b are spaced a predetermined distance E apart. Suppose that a function f (P) is used for converting encoder information P into a position of the hand unit 6, the encoder information P is a first angular position P1 when the hand unit 6 is positioned at the first reference position 16a, and the encoder information P is a second angular position P2 when the hand unit 6 is positioned at the second reference position 16a. When the hand unit 6 is moved from the first reference position 16a to the second reference position 16b, the drive roller 2 moves the timing belt 4 by a distance E1. Then, the distance E1 is calculated by using:

$$E1 = f(P2) - f(P1) \tag{1}$$

An elongation $\delta$ by which the timing belt 4 is elongated by moving the hand unit 6 from the first reference position 16a to the second reference position 16b is calculated by using:

$$\delta = \gamma\{f(P2) - f(P1)\} \tag{2}$$

Reference distance E can be expressed by Expression (3) from Expressions (1) and (2).

$$E = \{f(P2) - f(P1)\} + \gamma\{f(P2) - f(P1)\} \tag{3}$$

Therefore, $$\gamma = [E/\{f(P2) - f(P1)\}] - 1 \tag{4}$$

The elongation ratio $\gamma$ can be calculated by using Expression (4). Correction is made according to an elongation when the hand unit 6 is positioned at the first reference position 16a by using the elongation ratio $\gamma$. Suppose that the encoder information P about the angular position corresponding to the first reference position 16a is changed by a change ΔP. Then, a corrected function (P) is expressed by:

$$f(P)=f(P1)+\gamma \times f(\Delta P) \qquad (5)$$

Expression (6) is obtained by substituting Expression (4) in Expression (5).

$$f(P)=f(P1)+f(\Delta P)[E/\{f(P2)-f(P1)\}-1] \qquad (6)$$

The elongation compensating correction calculating device 65 calculates a correction by using Expression (6) and the driving signal generating device 71 corrects the driving signal according to the calculated correction.

The lifting apparatus 80 may include an elongation measuring and signaling device that generates an elongation signal representing the elongation of the timing belt 4. The elongation measuring and signaling device includes the elongation measuring device 10 and an elongation signaling device 15. As shown in FIG. 6, the controller 14 performs part of the function of the elongation measuring device 10 to provide an elongation indicating signal indicating an elongation in the timing belt 4. The controller 14 includes a decision device 64 and a threshold storage device 63 to perform part of the elongation measuring device 10.

The comparing device 62 gives a calculated elongation in the timing belt 4 to the decision device 64. A predetermined allowable elongation namely, a threshold, is stored in the threshold storage device 63. The allowable elongation is given to the set value input device 66, and the set value input device 66 gives the allowable elongation to the threshold storage device 63. The decision device 64 receives the allowable elongation from the threshold storage device 63 and an elongation in the timing belt 4 from the comparing device 62. The decision device 64 compares the received data. The decision device 64 determines information about whether or not the elongation in the timing belt 4 is greater than the allowable elongation and the difference between the allowable elongation and the calculated elongation, and gives the information to the elongation signaling device 15.

The elongation signaling device 15 provides an elongation signal representing the information received from the decision device 64 to inform the operator of the elongation. The signaling device 15 may provide a signal representing the elongation in the timing belt 4 and given thereto by the comparing device 62. The elongation signaling device 15 is, for example, a liquid crystal display or a CRT.

The elongation signaling device 15 does not need to display an elongation numerically. The elongation signaling device 15 may be a sounding device capable of generating a warning sound when the elongation in the timing belt 4 exceeds the allowable elongation, such as a buzzer. The elongation signaling device 15 may be a light-emitting device capable of providing a warning light signal when the elongation in the timing belt 4 exceeds the allowable elongation, such as a warning lamp.

Figure 10:
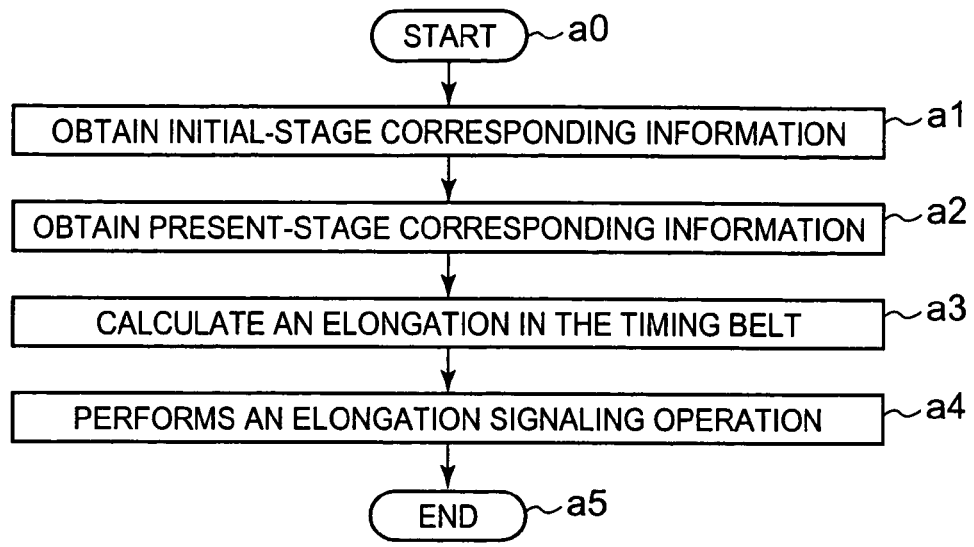
FIG. 10 is a flow chart of an elongation measuring and signaling operation to be carried out by a controller 14.

FIG. 10 is a flow chart of an elongation measuring and signaling operation to be carried out by the controller 14. In this embodiment, the controller 14 serves as the respective arithmetic means of the elongation measuring device 10 and the elongation signaling device 15. The controller 14 performs the elongation measuring operation and the elongation signaling operation.

When information about the replacement of the timing belt 4 with a new one is given to the controller 14 in step a0, the elongation measuring operation is started. In step a1, the corresponding information generating device 60 obtains initial-stage corresponding information at an initial stage of use of the timing belt 4. More specifically, the controller 14 gives a driving signal to the motor 3 when the hand unit 6 is attached to the new timing belt 4 and the hand unit 6 is set ready to move along the path of the hand unit 6. The hand unit 6 moves past the reference positions 16a and 16b.

When the hand unit 6 is positioned at the reference position 16a (16b), the corresponding information generating device 60 generates corresponding information on the basis of the sensor information and the encoder information. The corresponding information corresponding to the reference position 16a (16b) generated by the corresponding information generating device 60 is stored as initial-stage corresponding information in the corresponding information storage device 61. Step a2 is executed when an inspection instruction is given or predetermined periodic inspection time comes round.

In step a2, the controller makes the corresponding information generating device 60 generate corresponding information at the inspection time. More concretely, the controller 14 makes the driving signal generating device 71 give a driving signal to the motor 3 to move the hand unit along the path. The hand unit 6 is moved past the reference position 16a (16b). When the hand unit 6 comes to the reference position 16a (16b), the corresponding information generating device 60 generates corresponding information on the basis of the sensor information and the encoder information. The corresponding information generated by the corresponding information generating device 60 corresponding to the reference position 16a (16b) is given as present-stage corresponding information to the comparing device 62.

In step a3, the controller 14 makes the comparing device 62 compare the present-stage corresponding information for the reference position 16a (16b) generated by the corresponding information generating device 60 and the initial-stage corresponding information for the reference position 16a (16b) read from the corresponding information storage device 61. The controller 14 calculates an elongation in the timing belt 4 on the basis of the result of comparison of the present-stage and the initial-stage corresponding information.

In step a4, the controller 14 performs the elongation signaling operation. The controller 14 gives a calculated elongation to the elongation signaling device 15. The elongation signaling device 15 generates a signal indicating the calculated elongation received from the controller 14. Then, the controller 14 ends the elongation measuring and signaling operation in step a5.

When the controller 14 performs the elongation measuring and signaling operation, the elongation signaling device 15 provides the signal indicating the calculated elongation to notify the operator of the elongation in the timing belt 4. The operator is able to infer the condition of the timing belt 4 from the signal indicating the calculated elongation in the timing belt 4, to determine time for replacing the timing belt 4 with a new one and to take proper measures.

The elongation measuring device 10 in this embodiment measures an elongation in the timing belt 4 caused in a period between an initial stage when the timing belt was installed initially in the driving device and a present stage when the timing belt 4 is inspected. This elongation can be used for deciding the probability of breakage of the timing belt 4. Thus the operator is able to replace the timing belt 4 with a new one at time near forecast time when the timing belt may possibly break.

Accidental fall of the hand unit 6 due to the breakage of the timing belt 4 can be prevented by recognizing an indication of breakage of the timing belt 4, estimating time when the timing belt 4 may possibly break and changing the timing belt 4 before the same breaks. Consequently, it is possible to prevent damaging the semiconductor wafer supported by the hand unit 6 and other machines owing to the accidental fall of the hand unit 6.

According to the present invention, the breakage of the timing belt 4 can be forecast from the indication. Therefore, the driving device 1 does not need to be provided with a plurality of timing belt and is able to prevent damaging things by the hand unit 6 accidentally fallen due to the breakage of the timing belt 4. The driving device 1 provided with the single timing belt 4 is simpler in construction than the equivalent driving device mentioned in cited reference and provided with two timing belts, and facilitates tension adjustment.

In some cases, the lifting apparatus 80 is installed in a room of an adjusted atmosphere, such as a clean room. Frequent change of the timing belt 4 of the lifting apparatus 80 is detrimental to the clean room which must be kept in a clean condition. Since the time when the timing belt 4 may possibly break can be forecast, time to change the timing belt 4 can be determined according to the expected life of the timing belt 4 and the timing belt 4 does not need to be changed uselessly frequently. Consequently, the possibility of contamination of the clean room by the change of the timing belt 4 can be reduced and the working efficiency of the lifting apparatus 80 can be improved.

Figure 11:
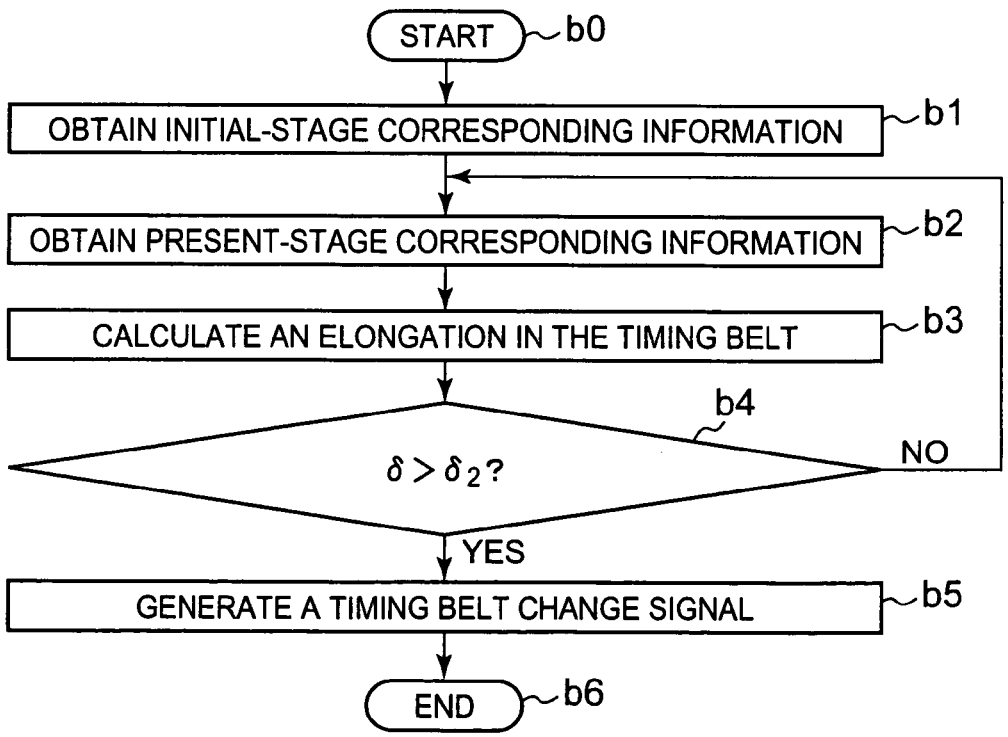
FIG. 11 is a flow chart of another elongation measuring and signaling operation to be carried out by the controller 14.

FIG. 11 is a flow chart of another elongation measuring and signaling operation to be carried out by the controller 14. As mentioned above, the controller 14 performs part of the functions of the elongation measuring device and the elongation signaling device. The controller 14 carries out the elongation measuring and signaling operation.

Steps b0 to b3 are the same as steps a0 to a3 shown in FIG. 10, respectively, and hence the description thereof will be omitted. After completing step b3, step b4 is executed.

In step b4, the controller 14 performs an elongation signaling operation different from that executed in step a3. The decision device 64 of the controller 14 compares a measured elongation with a predetermined allowable elongation $\delta_2$. When the measured elongation is greater than the allowable elongation $\delta_2$, the decision device 64 gives information to the elongation signaling device 15 to the effect that the measured elongation is greater than the allowable elongation $\delta_2$, and then step b5 is executed. If it is decided in step b4 that the measured elongation is less than the allowable elongation $\delta_2$, the elongation measuring and signaling operation returns to step b2. As shown in FIG. 8, the allowable elongation $\delta_2$ is not greater than a critical elongation $\delta_3$. Thus the timing belt 4 elongated by an elongation below the allowable elongation $\delta_2$ has a low breaking possibility. The operator may enter the allowable elongation $\delta_2$ by operating the set value input device 66.

In step b5, the controller 14 makes the decision device 64 give a timing belt change signal prompting changing the timing belt 4 to the elongation signaling device 15. Then, the elongation signaling device 15 provides a signal requesting changing the timing belt 4. The elongation measuring and signaling operation is ended in step b6.

The controller 14 compares the measured elongation with the predetermined allowable elongation $\delta_2$ and generates a signal indicating the result of comparison. Consequently, the operator is able to know easily the increase of an elongation in the timing belt beyond the allowable elongation $\delta_2$ and to change the timing belt 4.

The elongation signaling device 15 may generate a warning signal when a measured elongation exceeds the allowable elongation $\delta_2$ to inform the operator surely that the breakage of the timing belt 4 highly possible. If the measured elongation is not smaller than the allowable elongation $\delta_2$, the controller 14 may make the driving signal generating device 71 stop generating the driving signal to stop the motor 3. If the operator is not informed of the necessity of changing the timing belt 4, the timing belt 4 may be replaced with a new one in the next periodic adjustment period.

The allowable elongation $\delta_2$ may be determined such that the tension of the timing belt is in appropriate and the tension of the timing belt needs adjustment when the timing belt 4 elongates by an elongation exceeding the allowable elongation $\delta_2$. Thus the operator is able to know time for tension adjustment to tension the timing belt 4 properly and hence the hand unit 6 can be accurately positioned at a predetermined desired position.

Figure 12:
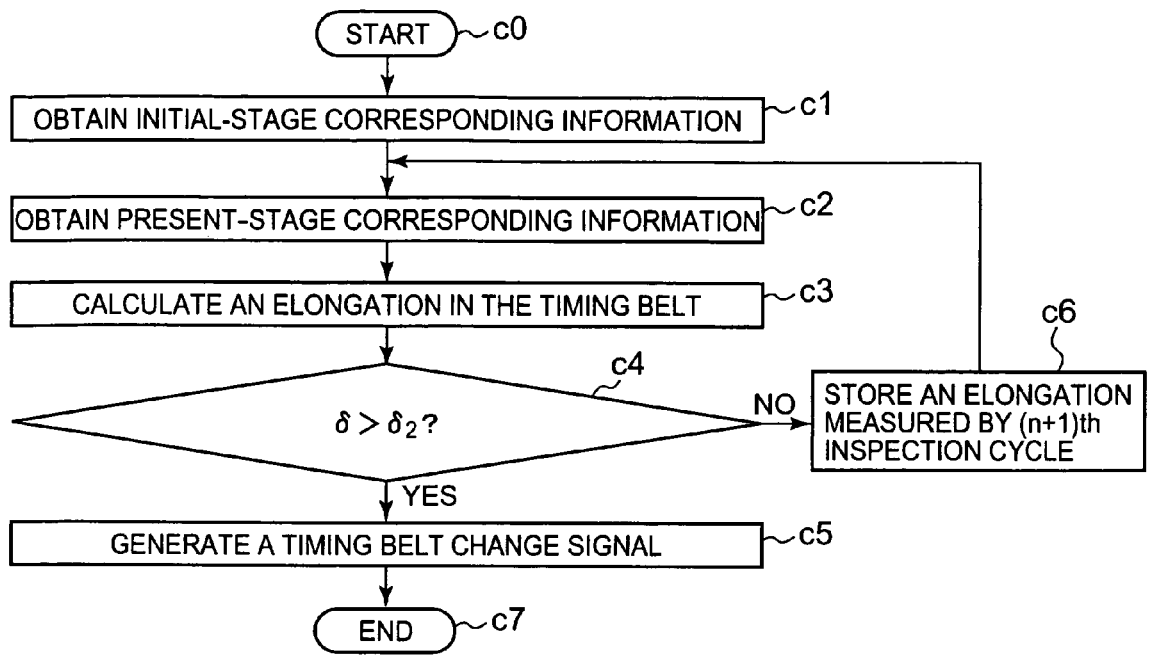
FIG. 12 is a flow chart of a third elongation measuring and signaling operation to be carried out by the controller 14.

FIG. 12 is a flow chart of a third elongation measuring and signaling operation to be carried out by the controller 14. As mentioned above, the controller 14 performs part of the functions of the elongation measuring device and the elongation signaling device. The controller 14 carries out the elongation measuring and signaling operation shown in FIG. 12 having a driving signal correcting step in addition to steps shown in FIG. 11.

Steps c0 to c3 are the same as steps a0 to a3 shown in FIG. 10, respectively, and hence the description thereof will be omitted. After completing step c3, step c4 is executed.

In step c4, the controller 14 compares a measured elongation with a predetermined allowable elongation $\delta_2$. When the measured elongation is greater than the allowable elongation $\delta_2$, the controller 14 gives information to the elongation signaling device 15 to the effect that the measured elongation is greater than the allowable elongation $\delta_2$, and then executes step c5. If it is decided in step c4 that the measured elongation is less than the allowable elongation $\delta_2$, step c6 is executed.

In step c6, the controller 14 makes the elongation compensating correction calculating device 65 calculate a correction for correcting the driving signal on the basis of the measured elongation, and executes step c2.

In step c5, the controller 14 gives information about the result of comparison of the measured elongation with the allowable elongation $\delta_2$ made by the comparing device 62 to the elongation signaling device 15. Then, the elongation signaling device 15 generates an elongation signal indicating that the measured elongation is greater than the allowable elongation $\delta_2$. Then, the elongation measuring and signaling operation is ended in step c7.

When the controller 14 performs the elongation measuring and signaling operation, the driving signal generating device 71 generates a driving signal on the basis of a moving distance specified by the moving distance setting device 70 to position the hand unit 6 at a predetermined desired position. The driving signal generating device 71 corrects a driving signal by a correction provided by the elongation compensating correction calculating device 65 and gives a corrected driving signal to the motor 3. The motor 3 drives the drive roller 2 according to the corrected driving signal to move the hand unit 6 to the predetermined desired position.

The driving signal is corrected on the basis of the measured elongation measured by the elongation measuring device 10. The controller 14 is able to give the driving signal corrected on the basis of the elongation to the motor 3 to position the hand unit 6 accurately at the predetermined desired position. Thus positioning the hand unit 6 at a position different from the desired position can be prevented and the accidental collision of the hand unit 6 with an obstacle can be avoided. Since the controller 14 calculates the correction on the basis of the measured elongation, the operator does not need to give an instruction requesting the correction of the angular position of the drive roller 2 even if the timing belt 4 elongates. Consequently, the frequency of adjusting work for compensating for the elongation in the timing belt 4 can be reduced.

A semiconductor wafer must be accurately positioned when the semiconductor wafer is carried by the lifting apparatus 80. For example, when the initial length of the timing belt 4 is 2 m and the timing belt 4 elongates by a length equal to 1% of the initial length, the position of the hand unit 6 will change by 2 mm. For example, a plurality of semiconductor wafers contained in a wafer container are supported in layers on racks arranged at pitches of 10 mm. Therefore a semiconductor wafer cannot be accurately put on the rack unless a correction is made to compensate for the elongation in the timing belt 4 and it is possible that the hand 6 strikes accidentally against a semiconductor wafer and to put a semiconductor wafer on the rack at a position other than a desired position.

Since the driving signal is corrected according to the elongation in the timing belt 4, the hand 6 can be accurately positioned and a desired semiconductor wafer can be surely held and carried by the hand unit 6. Damaging the semiconductor wafer can be avoided by thus accurately positioning the hand unit 6.

The semiconductor wafer is often carried in a clean room. Since the frequency of adjusting work for compensating for the elongation of the timing belt 4 can be reduced. The driving device 1 does not need to be adjusted frequently. Consequently, the frequency of the operator entering the clean room to compensate for the elongation of the timing belt 4 can be reduced and the possibility of contamination of the clean room can be reduced.

Figure 13:
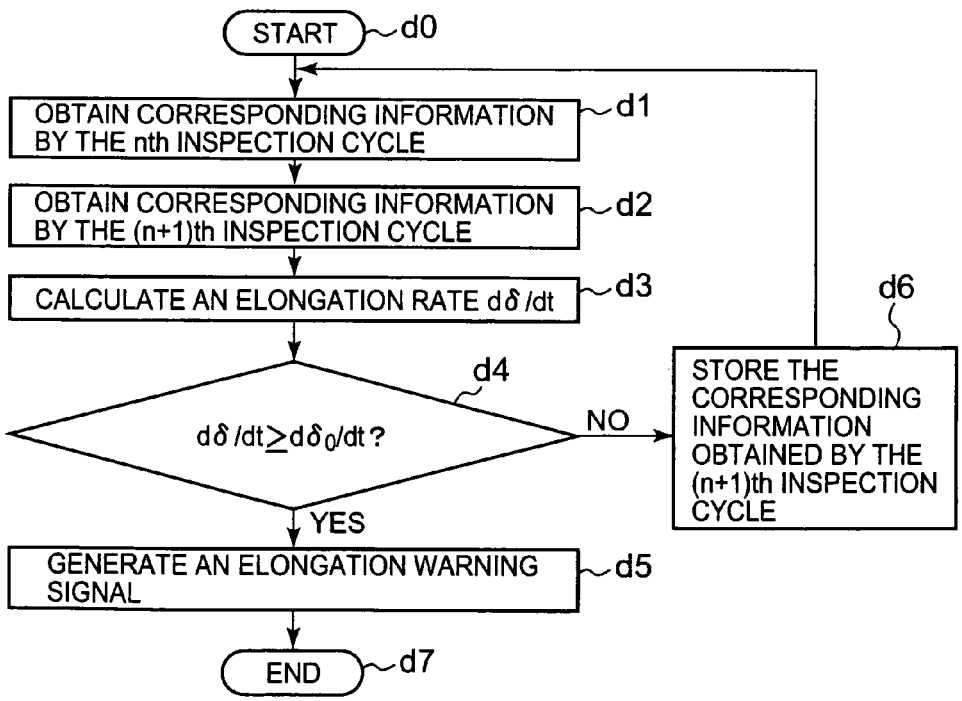
FIG. 13 is a flow chart of a fourth elongation measuring and signaling operation to be carried out by the controller 14.

FIG. 13 is a flow chart of a fourth elongation measuring and signaling operation to be carried out by the controller 14. In some cases, the controller performs an elongation measuring operation periodically.

The elongation measuring and signaling operation is started in step d0. The controller 14 starts the elongation measuring and signaling operation at an nth inspection time point a predetermined period after a preceding (n−1)th inspection time point in step d1.

In step d1, the controller 14 makes the corresponding information generating device 60 obtain corresponding information at the inspection time point. More specifically, the controller 14 gives a driving signal to the motor 3 to move the hand unit 6 past the reference positions 16a and 16b on the path. When the hand unit 6 is positioned at the reference position 16a (16b), gives corresponding information corresponding to the reference position 16a (16b) as present-stage corresponding information to the comparing device 62. After the present-stage corresponding information, namely, the nth inspection point corresponding information, has been obtained, step d2 is executed.

In this specification, "n" is a variable ordinal number referring to the nth inspection cycle of an inspection operation. Therefore, n=1 for the first inspection cycle performed after the replacement of an old timing belt with a new one. Step d2 is executed when an inspection instruction requesting inspecting the timing belt 4 for elongation or at a time point for the (n+1)th inspection cycle performed a predetermined period of time after the nth inspection cycle. The (n+1)th inspection cycle is performed a predetermined time after the nth inspection cycle.

In step d2, the controller 14 performs an operation similar to that performed in step d1 to obtain corresponding information at an inspection time point for the (n+1)th inspection cycle, and then step d3 is executed. In step d3, the controller 14 compares the corresponding information obtained by the nth inspection and that obtained by the (n+1)th inspection cycle; that is, the controller 14 compares an elongation measured by the nth inspection and an elongation measured by the (n+1)th inspection cycle. The controller 14 calculates an elongation rate $d\delta/dt$ from the elongation measured by the nth inspection and the elongation measured by the (n+1)th inspection cycle, and then executes step d4.

In step d4, the controller 14 compares the calculated elongation rate $d\delta/dt$ with an allowable elongation rate $d\delta_0/dt$. If $d\delta/dt \geq d\delta_0/dt$, the decision device 64 gives information to the signaling device 15 to the effect that the calculated elongation rate is not lower than the allowable elongation rate.

If $d\delta/dt \geq d\delta_0/dt$ in step d4, step d5 is executed. The allowable elongation rate $d\delta_0/dt$ is, for example, a value the timing belt will elongate in the period of time between the successive elongation inspecting operations in a little possibility of breakage. The allowable elongation rate is, for example, equal to the second elongation rate $d\delta_5/dt_5$ shown in FIG. 8. The operator may enter the allowable elongation rate by operating the set value input device 66.

If $d\delta/dt < d\delta_0/dt$ in step d4, step d6 is executed to store the corresponding information obtained by the (n+1)th inspection cycle in the corresponding information storage device 61, and then the elongation measuring and signaling operation returns to step d1.

If the response to a query made in step d4 is affirmative, step d5 is executed. In step d5, the controller 14 makes the decision device 64 give a timing belt change signal prompting changing the timing belt 4 to the elongation signaling device 15. Then, the elongation signaling device 15 provides a signal requesting changing the timing belt 4. The elongation measuring and signaling operation is ended in step d7.

The controller 14 performs the inspection operation periodically at predetermined intervals. Thus an elongation occurred between the preceding inspection cycle and the present invention inspection cycle can be determined. The elongation rate increases as the timing belt 4 wears and is about to break. After the elongation in the timing belt 4 exceeds the second set elongation $\delta_2$, the timing belt 4 elongates at a high elongation of $d\delta_6/dt_6$ and the possibility of breakage of the timing belt 4 increases. Therefore, the elongation rate at which the timing belt has elongated in the predetermined time interval between the preceding and the present inspection cycle can be used for deciding whether or not the timing belt is about to break. Thus the degree of wear of the timing belt 4 can be estimated on the basis of the elongation rate and the replacement of the timing belt 4 with a new one can be properly timed. Thus time when the timing belt may possibly break can be accurately estimated regardless of the working condition and the working environment of the timing belt 4.

The inspection cycles may be performed wither periodically or at different time intervals. For example, it is preferable that the inspection cycles are performed at comparatively long time intervals until the elongation in the timing belt 4 increases to the second allowable elongation $\delta_2$ and are performed at comparatively short time intervals after the elongation has exceeded the second allowable elongation $\delta_2$. As shown in FIG. 8, an elongation $\delta$ by which the timing belt 4 elongates in the time interval between the successive inspection cycles is small even if the time interval is long until the elongation increases to the second set elongation $\delta_2$ because the timing belt 4 elongates at the second elongation rate $d\delta_5/dt_5$ lower than the third elongation rate $d\delta_6/dt_6$ until the elongation $\delta$ increases to the second set elongation $\delta_2$. Therefore, any problem arises in the measurement of the elongation $\delta$ even if the time intervals are comparatively long. Thus the frequency of the inspecting operation can be reduced. The possibility of breakage of the timing belt increases after the elongation $\delta$ has exceeded the second allowable elongation $\delta_2$. Therefore, the breakage of the timing belt 4 can be more surely avoided by performing the inspecting operation at shorter time intervals or by continuously monitoring the elongation of the timing belt after the elongation δ has exceeded the second allowable elongation $\delta_2$.

The lifting apparatus 80, the driving device 1, the controller 14 and the elongation measuring and signaling device are only examples, and many changes and modifications may made therein without departing from the scope of the present invention. For example, the driving device 1 may be provided with a belt-like member other than the timing belt 4, such as a steel belt, a V belt, a chain or a wire, for the same effect.

The lifting apparatus 80 may be used for driving a belt-like member or may carry a semiconductor wafer. Although the lifting apparatus 80 is an example of a power transmitting device provided with a driving device and a controller, and a carrying device in this embodiment, the present invention may be other power transmitting device and other carrying device having a belt-like member and a rotating drive member. The motor and the belt-like member may be disposed at positions other than those mentioned above. For example, the drive roller may be disposed at an upper part of the frame 7 and the driven roller may be omitted.

Although the elongation measuring device measures an elongation in the timing belt 4, a shrinkage in the timing belt 4 may be measured by a shrinkage measuring device similar in configuration to the elongation measuring device.

The operations of the controller 14 shown in FIGS. 10 to 13 can be readily achieved by the execution of operations specified in the operation programs stored in the storage device of the controller 14 by the arithmetic unit. The operations of the controller 14 can be simply changed by changing the operation programs. The controller 14 may read a program from a readable storage device and may carry out operations specified in the program.

The lifting apparatus 80 has a correcting function to correct the drive signal on the basis of the elongation δ in the timing belt 4. The hand unit 6 can be accurately positioned owing to the correcting function even if the timing belt elongates by an elongation equal to 1% of the initial length of the timing belt 4. Consequently, it is possible to prevent the wrong placement of the hand unit 6 at an undesired position due to the elongation of the timing belt 4. The correcting function enables the omission of the operator's correcting operation and hence the frequency of operator's maintenance work can be reduced.

The controller 14 is able to make the elongation signaling device 15 generate a warning signal when the elongation δ in the timing belt 4 exceeds the allowable elongation and the timing belt 4 needs tension adjustment. Thus the operator is able to know the time for tension adjustment. Therefore the timing belt 4 can be always properly tensioned and hence the hand unit can be accurately positioned at the predetermined desired position. Since the signaling device 15 provides a signal indicating the condition of the timing belt 4, the tension of the timing belt 4 can be adjusted at optimum time and the frequency of tension adjustment can be reduced.

Since the signaling device 15 is able to generate a warning signal when the timing belt 4 elongates excessively, the operator is able to know surely that the possibility of breakage of the timing belt 4 is very high. Thus the indication of breakage of the timing belt 4 can be obtained through the observation and examination of the characteristic parameters of the timing belt 4.

What is claimed is:

1. An elongation measuring device for measuring an elongation in a belt-like member included in a driving device having a rotating drive member supported for rotation about an axis, a rotative driving means for driving the rotating drive member for rotation, and the belt-like member wound round the rotating drive member and holding a movable object to be moved to a desired position, said elongation measuring device comprising:
   an angular position measuring means for measuring an angular position of the rotating drive member;
   a movable object detecting means for detecting the movable object positioned at a reference position on a path along which the movable object moves; and
   an arithmetic means for comparing an angular position of the rotating drive member at a present stage when the movable object is positioned at the reference position and an angular position of the rotative driving means at a past stage when the movable object was positioned at the same reference position a predetermined time before the present stage;
   wherein the rotating drive member is provided with a plurality of driving protrusions circumferentially arranged at intervals, the belt-like member is provided with a plurality of driven protrusions arranged at longitudinal intervals, the belt-like member is wound round the rotating drive member with the driving protrusions of the rotating drive member engaged with the driven protrusions of the belt-like member, respectively, and a plurality of reference positions are set at intervals on the path of the movable object.

2. The elongation measuring device according to claim 1, wherein the past stage corresponds to time when the belt-like member was initially installed in the driving device.

3. The elongation measuring device according to claim 1, wherein the past stage corresponds to time when an elongation in the belt-like member was measured in a preceding elongation measuring cycle.

4. A controller for controlling the driving device stated in claim 1, said controller comprising:
   the elongation measuring device and;
   a driving signal generating means for generating a driving signal to be given to the rotative driving means;
   wherein the driving signal generating means corrects the driving signal on the basis of measured data provided by the elongation measuring device.

5. The controller according to claim 4, wherein an object of control is a driving device for driving a carrying mechanism for carrying a semiconductor wafer.

6. An elongation measuring and signaling device for providing an elongation signal indicating a condition of elongation of the belt-like member of the driving device stated in claim 1, said elongation measuring and signaling device comprising:
   the elongation measuring device and;
   an elongation signal generating means for generating an elongation signal representing information about a measured elongation.

7. The elongation measuring and signaling device according to claim 6 further comprising an elongation comparing means for comparing a measured elongation with a predetermined allowable elongation;
   wherein the elongation signal generating means generates a signal indicating result of comparison made by the elongation comparing means.

* * * * *